No. 620,528. Patented Feb. 28, 1899.
W. F. AIDLOTT.
DRAFT EQUALIZER.
(Application filed Apr. 9, 1898.)
(No Model.)

W. F. Aidlott
Inventor

Witnesses
E. E. Overholt
A. K. Williams, Jr.

By W. T. FitzGerald
Attorney

UNITED STATES PATENT OFFICE.

WILLIAM F. AIDLOTT, OF HIATTVILLE, KANSAS.

DRAFT-EQUALIZER.

SPECIFICATION forming part of Letters Patent No. 620,528, dated February 28, 1899.

Application filed April 9, 1898. Serial No. 677,031. (No model.)

*To all whom it may concern:*

Be it known that I, WILLIAM F. AIDLOTT, a citizen of the United States, residing at Hiattville, in the county of Bourbon and State of Kansas, have invented certain new and useful Improvements in Draft-Equalizers; and I do hereby declare the following to be a full, clear, and exact description of the invention, such as will enable others skilled in the art to which it appertains to make and use the same.

My invention relates to certain new and useful improvements in what is termed an "evener," designed to equalize the application of the draft, to which the horses or other animals may be attached, so that each of them will be required to draw only their share of the load.

My invention, as will be hereinafter clearly specified, pointed out in the claims, and illustrated in the accompanying drawings, consists in certain details of construction and combination of parts deemed necessary to provide an evener to which three horses may be attached, it being understood that a greater number of animals may be accommodated by a mere multiplication and adjustment of the parts illustrated.

Figure 4:
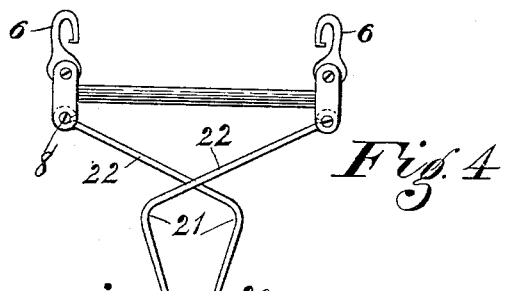
Figure 1:
Figure 2:
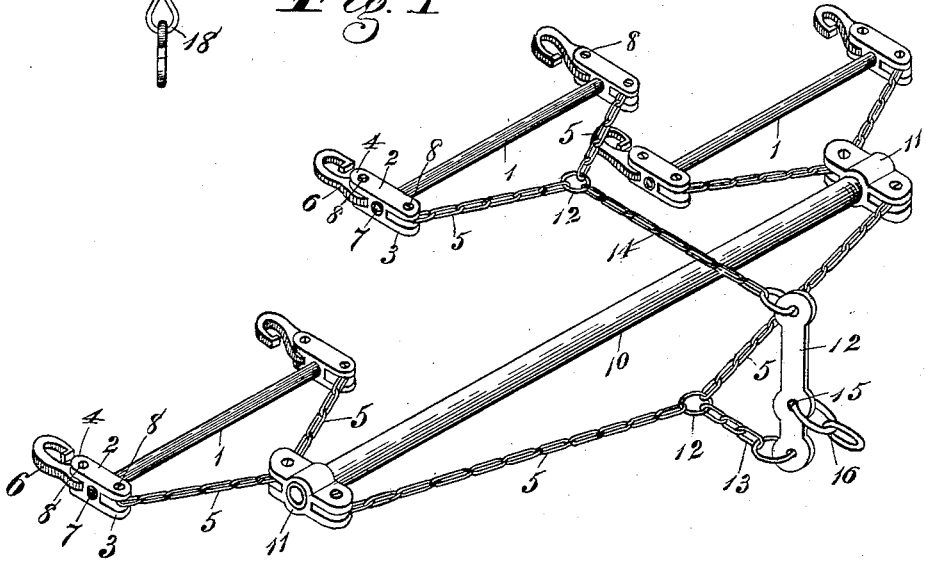
Figure 2:
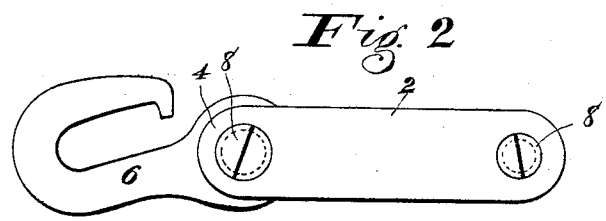

In the accompanying drawings, Figure 1 is a perspective view of my invention complete assembled in position ready for the accommodation of three horses. Fig. 2 is a top plan view showing one of the end clips upon an enlarged scale over that employed in Fig. 1, while Fig. 3 is a side view of said clip, showing the same ready to be attached in position, while Fig. 4 shows another form.

Figure 3:

Referring to the several parts of my invention, 1 is the reach, commonly termed a "singletree," upon each end of which I secure, preferably by screw-threads, the clip illustrated in Figs. 2 and 3, which consists of the central or top section 2 and the parallel end extensions 3 and 4, said end extensions being sufficiently separated to receive between them, respectively, a link of the rods or chains 5 and the pivoted end of the hook 6. The body-section 2 is provided with a threaded bore 7, designed to receive the threaded end of the reach 1, by means of which these parts are securely held in an adjusted position.

In order that the link and hook may be readily removed from their respective positions between the bifurcated ends of the body 2, I provide the screw-anchored bolt or locking-pin 8, one end of which is seated in the threaded socket in one of the parallel sections 3.

In order that the rear locking-bolt 8 may be reinforced in such a way that even though it be of small diameter it will sustain the draft placed upon it, I provide the reinforcing lugs or points 9, integrally formed with the sections 3 and extending toward each other, though their terminal ends shall remain a sufficient distance apart to permit the link of the rods or chains 5 to be entered between them for the purpose of being engaged by the bolt 8, which is then turned home in its threaded socket.

The reach (indicated by 10) is commonly termed the "doubletree" and is provided at either end with the clips 11, which may be of the construction set forth or of that more particularly described in Figs. 2 and 3.

It is thought that better results will be attained by forming the reaches 1 and 10 tubular, as the same may be readily produced by cutting any suitable piping of sufficient length, the diameter of said piping to be determined by the character of the work to which they are to be applied.

The rods or chains are of sufficient length to provide that the connecting-ring 12, attached to the ends thereof, will stand slightly away from the reach, as is usual in appliances of this character.

In order that provision may be made for attaching three horses to any vehicle in such a manner that said animals will stand side by side and equally share in drawing the load, I provide the compensating lever 12, connected at its lower end with the rods or chains 13, the latter having connection with the ring 12 and at its upper end with the chain 14, joined to the ring 12, it being understood that said lever 12 is of sufficient length to provide a proper location of the aperture 15, to which the draft rods or chains 16, attached to the load, are connected.

The arrangement just set forth, it will be clear, will, if the aperture 15 is properly located, proportionately divide the load, so that each animal will draw one-third of the same, which would not be the case if each horse was connected directly and rigidly to the vehicle.

It will be understood that I have provided a very simple though reliably-efficient device of the character specified, which may be very cheaply and expeditiously produced.

In Fig. 4 will be seen another form of my invention, wherein rods are employed in lieu of chains. I prefer to employ but one rod bent upon itself to form the middle link or rear end section 18, and then twisting the wires together, as indicated at 19, which wire then extends tangentially, forming the sections 20, each of said sections being provided with the obtuse angle 21, providing the sections 22, which cross each other, as shown, the free ends of each being provided with an eye or integrally-formed link designed to be received by one of the securing-screws 8, as in the case when the chain is employed. It is clear that rods may be substituted instead of chains. (Shown in Fig. 1.)

The several clips may be easily placed in position upon the threaded ends of the reach and as easily removed for purposes of transportation when desired. The several parts being formed of metal will of course prove of more permanent character, and as the said reaches are tubular they will be of less weight than if formed of wood, while the strength thereof will not be impaired. The provision made for reinforcing the locking-bolt 8, as shown in Fig. 3, will enable a bolt of small diameter to be employed, which is preferably made of hardened steel, as the reinforcing-ribs 9 will hold said bolt securely in position, as the tendency of the link will be to drop down toward the lower end of said bolt, thus placing the wear upon the same at a point thereon immediately in front of the lower rib or point 9.

Having thus fully described my invention, what I claim as new, and desire to secure by Letters Patent, is—

1. The herein-described equalizer or draft appliance, consisting of the reach-sections, clips having rearward and forwardly extending bifurcated ends, chains or rods connecting the rear ends of said clips with the vehicle or draft, and reinforcing ribs or points integrally formed upon the inner face of said clips and upon the rear side of the locking-bolt 8, whereby said bolt will be reinforced against a rearward pull, substantially as specified and for the purpose set forth.

2. As an improvement in clips, the herein-described end attachment for reaches consisting of the body-section 2 having bifurcated ends; a hook pivoted in the forward end of said body; ribs formed upon the inner faces of the rear end of said body whereby the locking-bolt 8 seated therein will be strengthened against a rearward pull, substantially as set forth.

In testimony whereof I affix my signature in presence of two witnesses.

WILLIAM F. AIDLOTT.

Witnesses:
  H. S. WALLACE,
  E. S. PERRY.